(12) United States Patent
Sasaki (10) Patent No.: US 12,032,222 B2
(45) Date of Patent: Jul. 9, 2024

(54) OPTICAL APPARATUS

(71) Applicant: CANON KABUSHIKI KAISHA, Tokyo (JP)

(72) Inventor: Kunihiko Sasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 17/070,094

(22) Filed: Oct. 14, 2020

(65) Prior Publication Data

US 2021/0116672 A1  Apr. 22, 2021

(30) Foreign Application Priority Data

Oct. 18, 2019  (JP) .................................. 2019-190710

(51) Int. Cl.
*G02B 7/09* (2021.01)
*G02B 15/14* (2006.01)

(52) U.S. Cl.
CPC ............. *G02B 7/09* (2013.01); *G02B 15/146* (2019.08)

(58) Field of Classification Search
CPC .......... G02B 7/09; G02B 7/102; G02B 15/16; G02B 15/146; G02B 15/1461; G02B 15/14; G03B 3/10; G03B 3/12

USPC .......................... 359/676, 683–685, 694–704
See application file for complete search history.

(56) References Cited

U.S. PATENT DOCUMENTS

| 2020/0218030 A1* | 7/2020 | Kishimoto | ............... G03B 5/00 |
| 2020/0225441 A1* | 7/2020 | Kishimoto | ............... G02B 7/04 |

FOREIGN PATENT DOCUMENTS

| JP | 2001-208956 A | 8/2001 |
| JP | 2006-178006 A | 7/2006 |
| JP | 2014-016513 A | 1/2014 |
| JP | 2019-133009 A | 8/2019 |

* cited by examiner

*Primary Examiner* — Marin Pichler
(74) *Attorney, Agent, or Firm* — Carter, DeLuca & Farrell LLP (57) ABSTRACT

The disclosed optical apparatus includes a first movable member movable in an optical axis direction a holding member holding an optical element and movable with respect to the first movable member in the optical axis direction, a guide member held by the first movable member and guides the holding member in the optical axis direction, a second movable member movable in the optical axis direction independently of the first movable member, and a drive unit configured to drive the holding member in the optical axis direction. The drive unit is held such that displacement of the drive unit with respect to the second movable member in the optical axis direction is restricted by the second movable member.

17 Claims, 7 Drawing Sheets

OPTICAL APPARATUS

BACKGROUND OF THE INVENTION

Field of the Invention

The present invention relates to an optical apparatus capable of driving an optical element.

Description of the Related Art

As an optical apparatus that drives an optical element such as a lens in an optical axis direction by using a drive unit such as a motor, one is provided that drives the lens with respect to a base member by the motor, and has a lens drive assist system in which a user's rotation operation of a cam ring moves the base member in the optical axis direction. This lens drive assist system makes it possible to drive the lens by a total drive amount of a drive amount of the base member (base drive amount) and a drive amount of the lens (motor drive amount) with respect to the base member.

Further, Japanese Patent Laid-Open No. 2014-16513 discloses a technique of controlling a motor by using electronic cam data to move a focus lens in order to correct focus variation due to movement of a magnification-varying lens. The electronic cam data is data indicating a position of the focus lens (in-focus position) at which an in-focus state is obtained for each position of the magnification-varying lens (zoom position) for each object distance.

However, as in the electronic cam data disclosed in Japanese Patent Laid-Open No. 2014-16513, in general, the difference between the in-focus position for infinity when the zoom position is at the wide-angle end and the in-focus position for a close distance when the zoom position is at the telephoto end is large. When the focus lens is driven by the above-described lens drive assist system according to such electronic cam data, since the base drive amount (cam lift) between the wide-angle end and the telephoto end is constant regardless of the object distance, it is necessary to increase the motor drive amount of the focus lens. As a result, the optical apparatus becomes large in size.

SUMMARY OF THE INVENTION

The present invention provides an optical apparatus capable of ensuring a large total drivable amount of an optical element while reducing an increase in motor drive amount of the optical element.

An optical apparatus according to an aspect of the present invention includes a first movable member that is movable in an optical axis direction a holding member that holds an optical element and is movable with respect to the first movable member in the optical axis direction, a guide member that is held by the first movable member and guides the holding member in the optical axis direction, a second movable member that is movable in the optical axis direction independently of the first movable member, and a drive unit configured to drive the holding member in the optical axis direction. The drive unit is held such that displacement of the drive unit with respect to the second movable member in the optical axis direction is restricted by the second movable member.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 2:
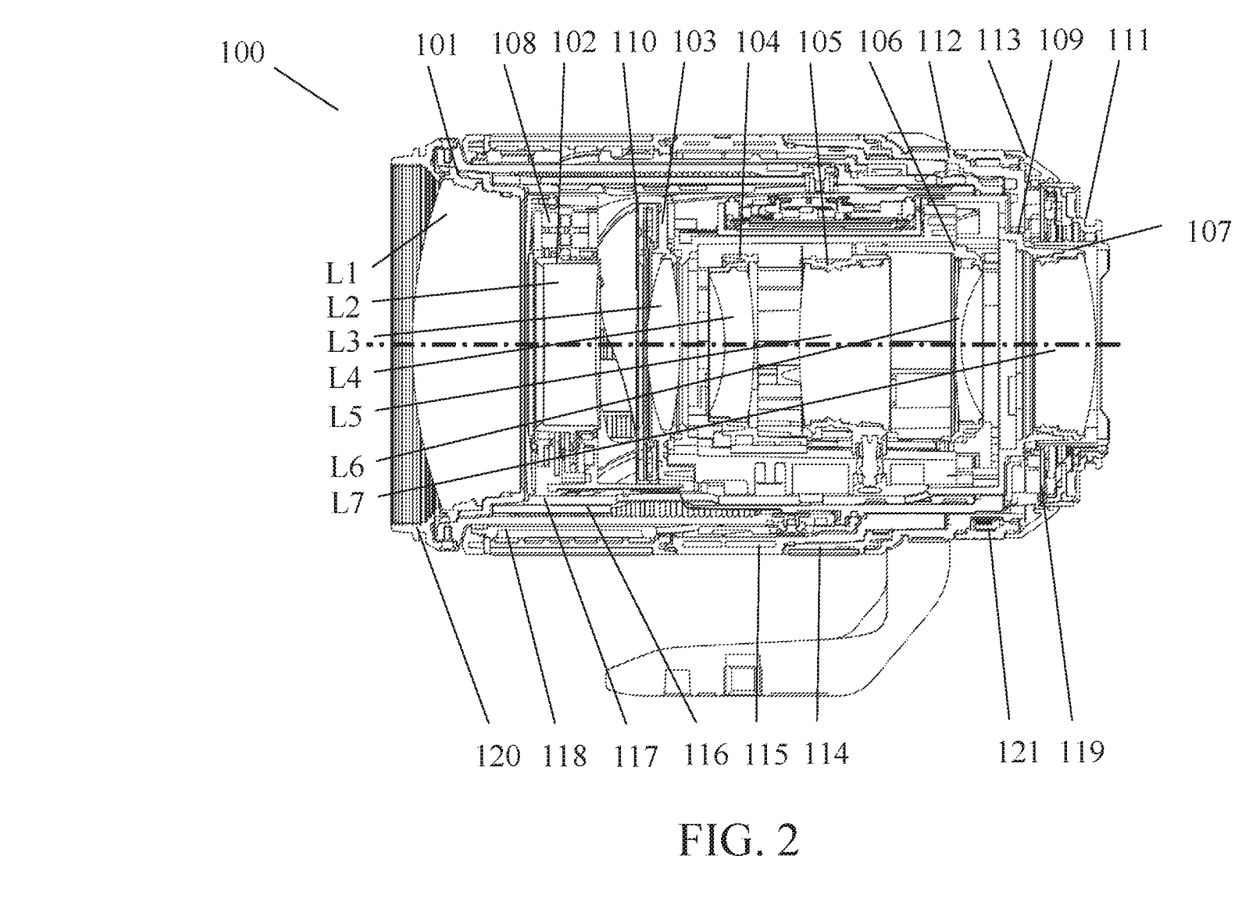
FIG. 2 is a sectional view illustrating a configuration of the interchangeable lens of the embodiment at a wide-angle end.
Figure 3:
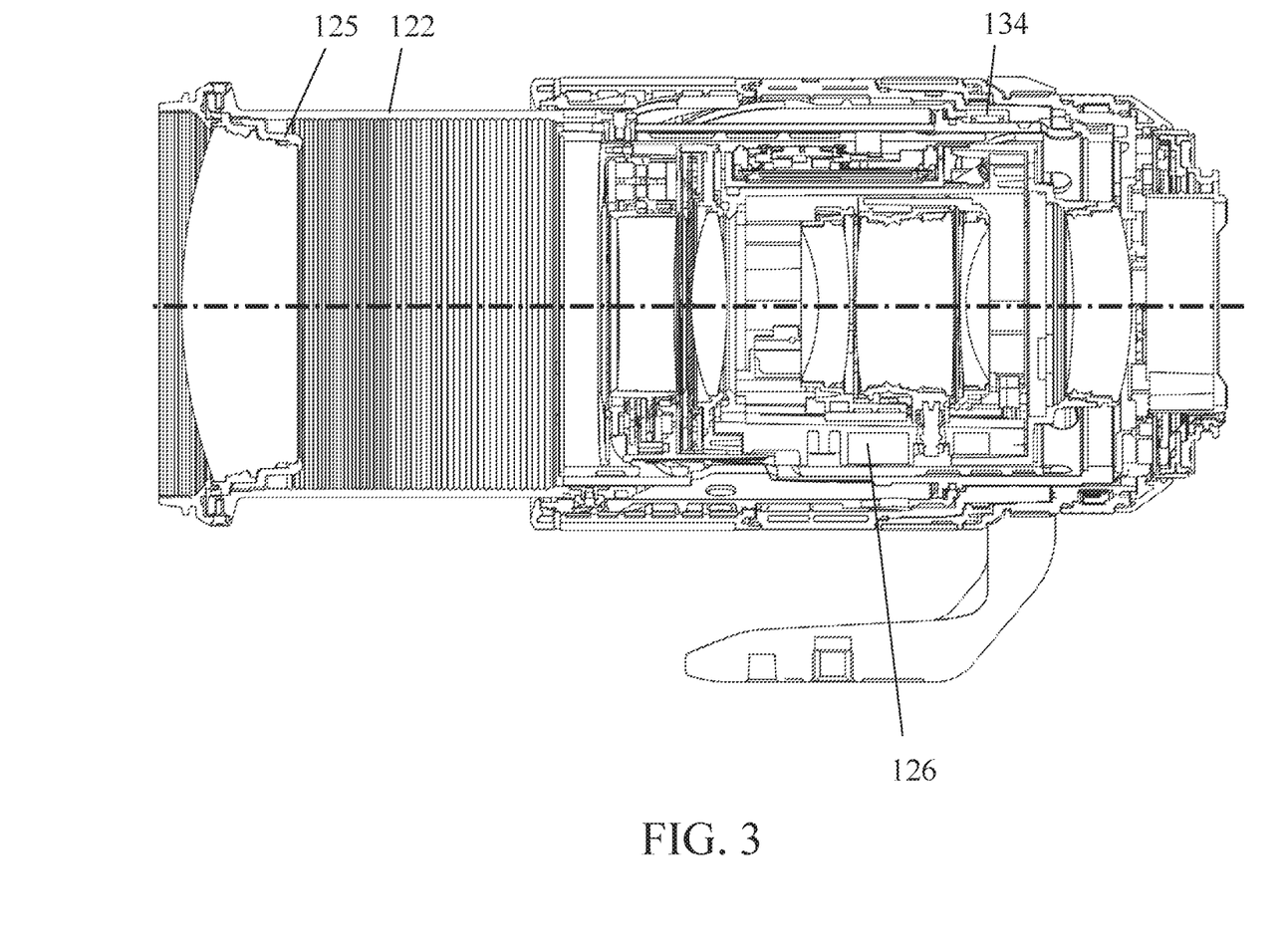
FIG. 3 is a sectional view illustrating a configuration of the interchangeable lens of the embodiment at a telephoto end.
Figure 4:
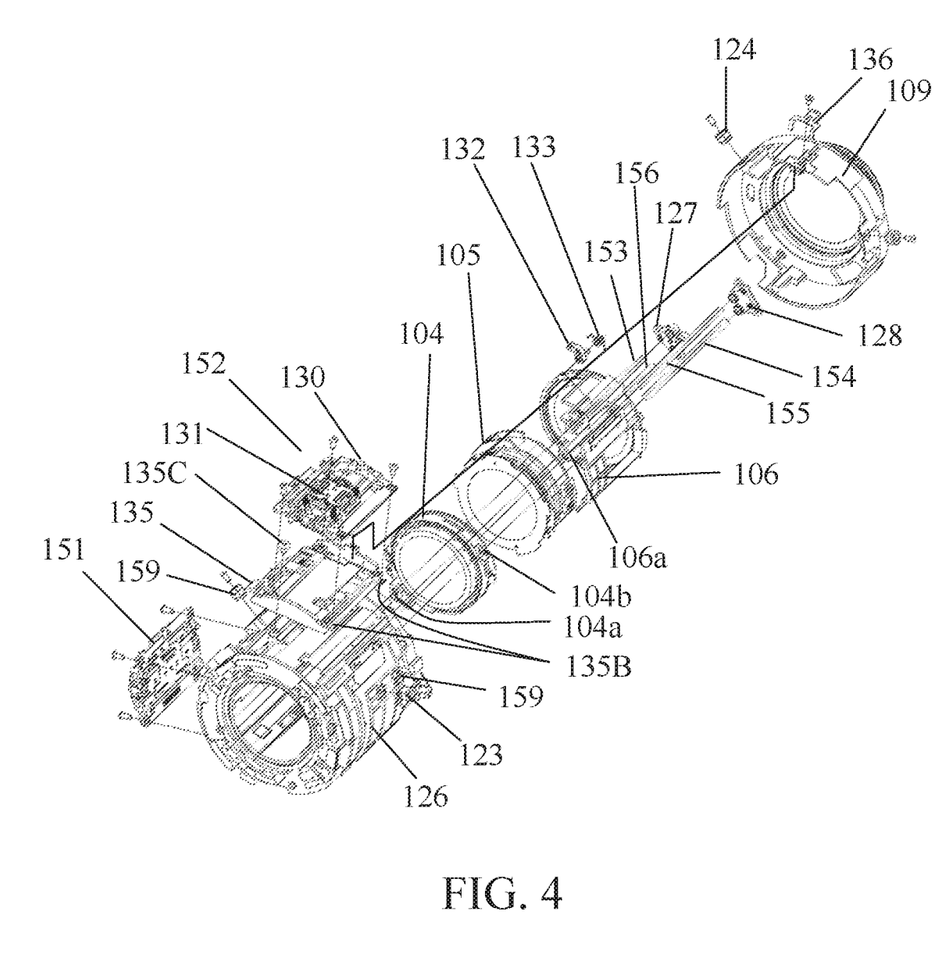
FIG. 4 is an exploded perspective view of a rear unit in the interchangeable lens of the embodiment.

FIGS. 2 and 3 illustrate a configuration of an interchangeable lens 100 as an optical apparatus (lens apparatus) that is an embodiment of the present invention. FIG. 2 illustrates a section of the interchangeable lens 100 at a wide-angle end, the interchangeable lens 100 being cut parallel to an optical axis. FIG. 3 illustrates a section of the interchangeable lens 100 at a telephoto end, the interchangeable lens 100 being cut parallel to the optical axis. FIG. 4 illustrates a rear unit of the interchangeable lens 100 in a disassembled view.

The interchangeable lens 100 is detachably attachable to a camera body as an imaging apparatus (not illustrated) including an image sensor such as a CCD sensor or a CMOS sensor. The interchangeable lens 100 has an imaging optical system including first to seventh lens unit L1 to L7 arranged in order from an object side (front side).

The imaging optical system causes light from an object (not shown) to form an object image on the image sensor in the camera body. The fourth lens unit L4 as a floating lens unit and the sixth lens unit L6 as a focus lens unit move in an optical axis direction to perform focusing. The first to seventh lens units L1 to L7 move in the optical axis direction to perform zooming. Although this embodiment describes the interchangeable lens as the optical apparatus, the optical apparatus may be a lens-integrated imaging apparatus.

A lens mount 111 has a bayonet portion for detachably attaching to the camera body, and is fixed to a rear fixed barrel 112 with screws via an exterior barrel 113. The exterior barrel 113 is sandwiched and fixed between the lens mount 111 and the rear fixed barrel 112. A front fixed barrel 115 is fixed to the rear fixed barrel 112 with screws. A zoom index and operation switches (not illustrated) are attached to the front fixed barrel 115.

A guide barrel 116 is fixed to the rear fixed barrel 112 with screws. The guide barrel 116 is provided with a straight groove portion formed for guiding each lens unit in the optical axis direction. Further, the guide barrel 116 is provided with a cam groove portion with which a cam follower (not illustrated) fixed to a cam barrel 117 with screws is engaged. With this configuration, the cam barrel 117 moves straight in the optical axis direction while rotating around the optical axis during zooming. The cam barrel 117 is provided with a plurality of cam groove portions that linearly move the respective lens units during zooming.

A zoom operation ring 118 is held rotatably about the optical axis by being radially fitted to the guide barrel 116 and bayonet-engaged therewith. When the zoom operation ring 118 is rotated by a user's manual zoom operation, a cam function by engagement of a cam groove portion formed in the zoom operation ring 118 and a cam follower provided on a straight-movable barrel 122 and a straight guide function of the straight groove portion of the guide barrel 116 moves straight the straight-movable barrel 122 in the optical axis direction. The cam follower on the straight-movable barrel 122 is also engaged with the cam groove portion of the cam barrel 117, so that when the straight-movable barrel 122 moves straight, the cam barrel 117 rotates about the optical axis. In this motion, the cam barrel 117 that is rotatable and movable straight with respect to the guide barrel 116 moves straight while rotating due to the straight movement of the straight-movable barrel 122.

Rear unit cam followers 123 provided on the rear unit (described later) at three circumferential locations about the optical axis and seventh unit cam followers 124 provided on a seventh unit (described later) at three circumferential locations are engaged with the straight groove portion of the guide barrel 116 and the cam groove portions of the cam barrel 117. Thereby, when the cam barrel 117 rotates and moves straight with respect to the guide barrel 116, the rear unit and the seventh unit are separately driven in the optical axis direction.

As described above, the interchangeable lens 100 of this embodiment has the configuration in which the rotation of the zoom operation ring 118 moves the straight-movable barrel 122 straight (the first lens unit L1 fixed to the straight-movable barrel 122 is also moved in the optical axis direction as described later), and rotates the cam barrel 117 while moving it straight, thereby moving the second to seventh lens units L2 to L7 in the optical axis direction.

A first lens holding frame 101 holds the first lens unit L1 and is fixed to the straight-movable barrel 122 with screws. A first lens retaining ring 125 has a female screw formed on its inner peripheral portion and is fixed by being screwed into a male screw formed on an outer peripheral portion of the straight-movable barrel 122. The first lens retaining ring 125 has a role of fixing the first lens unit L1.

The straight-movable barrel 122 is provided with bayonet claws for attaching a hood on its outer peripheral portion. Further, the straight-movable barrel 122 is provided with a screw for attaching an accessory such as a filter on its inner peripheral portion.

A second lens holding frame 102 holds the second lens unit L2 and configures a part of an image stabilizing unit 108. The image stabilizing unit 108 holds the second lens holding frame 102 so as to be movable in a direction orthogonal to the optical axis (hereinafter referred to as "a shift direction"), and drives the second lens holding frame 102 in the shift direction by a shift actuator to reduce image blur. The shift actuator includes magnets and coils. The image stabilizing unit 108 is held by being suspended from the guide barrel 116 via cam followers.

A third lens holding frame 103 holds the third lens unit L3, and is held by a rear unit base 126 via three cam followers (129 in FIG. 5) arranged at three circumferential locations on the third lens holding frame 103. The rear unit base 126 is movable in the optical axis direction with respect to fixed cylinders 112 and 115 (described later) and the guide barrel 116. The rear unit base 126 corresponds to a first movable member. The third lens holding frame 103 moves in the optical axis direction by the straight movement of the rear unit base 126 during zooming. Further, the third lens holding frame 103 holds an electromagnetic diaphragm unit 110 including a plurality of diaphragm blades and a diaphragm actuator that drives the diaphragm blades in open and close directions.

A fourth lens holding frame 104 as a first holding member holds the fourth lens unit L4 as an optical element, and is guided straightly by a guide bar 153 as a first guide member. The guide bar 153 is held at its front and rear ends by the rear unit base 126 and a first rear unit cover 127 fixed to the rear unit base 126. The fourth lens unit L4 (fourth lens holding frame 104) is moved in the optical axis direction by the rear unit base 126 moving in the same direction during zooming. Further, the fourth lens unit L4 is moved with respect to the rear unit base 126 in the optical axis direction by being driven in the same direction by a fourth lens drive unit 151 as a first drive unit (first actuator).

The fourth lens holding frame 104 is provided with a scale (not illustrated) for detecting its position in the optical axis direction. An optical sensor (described later) facing the scale is fixed to the rear unit base 126 via a flexible printed circuit board (FPC). The scale and the optical sensor constitute a position detector.

A fifth lens holding frame 105 as a third holding member holds the fifth lens unit L5 as an optical element, and is held by the rear unit base 126 via three cam followers (holding portions) fixed at three circumferential locations on the fifth lens holding frame 105. The fifth lens holding frame 105 is moved in the optical axis direction by the straight movement of the rear unit base 126 during zooming.

A sixth lens holding frame 106 as a second holding member holds the sixth lens unit L6 as an optical element, and is guided straightly by a guide bar 155 as a second guide member. The guide bar 155 is held at its front and rear ends by the rear unit base 126 and the first rear unit cover 127.

A motor unit drive base 135 is attached to the rear unit base 126 so as to be movable in the optical axis direction, and is bayonet-engaged with the seventh unit base 109 so as to be integrated therewith only in the optical axis direction. The motor unit drive base 135 and the seventh unit base 109 each correspond to a second movable member that is movable in the optical axis direction independently (separately) of the rear unit base 126. A seventh unit spring 136 attached to the seventh unit base 109 generates a biasing force for removing backlash between the seventh unit base 109 and the motor unit drive base 135 in the optical axis direction. The sixth lens holding frame 106 is driven in the optical axis direction with respect to the motor unit driving base 135 by a sixth lens driving motor unit 152 as a second drive unit (second actuator).

A seventh lens holding frame 107 holds the seventh lens unit L7, and is screwed and fixed to the seventh unit base 109. During zooming, the seventh lens holding frame 107 is driven in the optical axis direction together with the seventh unit base 109 by three cam followers provided on the seventh unit base 109. The seventh unit base 109 and the seventh lens holding frame 107 constitute the seventh unit.

In this embodiment, as the fourth lens drive motor unit 151 and the sixth lens drive motor unit 152, a vibration-type linear motor using piezoelectric elements is used. The vibration-type linear motor includes a motor stator 130, a motor mover 131 in which vibration is excited by the piezoelectric elements and thereby is moved in the optical axis direction with respect to the motor stator 130, and a motor output portion that is moved together with the motor mover 131.

The motor stators 130 of the fourth and sixth lens drive motor units 151 and 152 are fixed to the motor unit drive base 135. The motor unit drive base 135 corresponds to the second movable member as described above, and constitute together with the rear unit base 126, a base member that holds the fourth and sixth lens drive motor units 151 and 152 together with the rear unit base 126.

Figure 8:
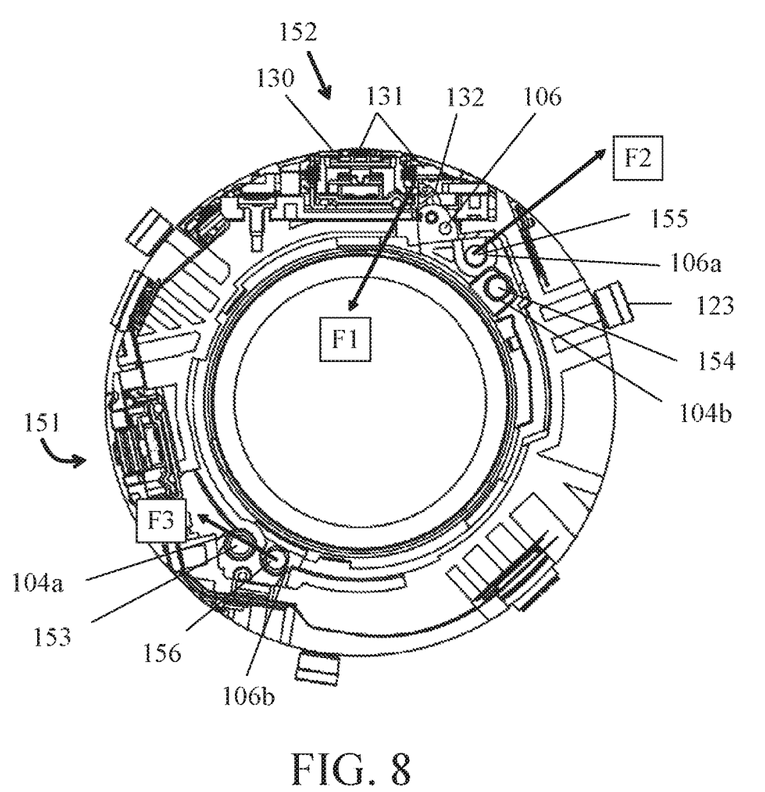
FIG. 8 is a diagram illustrating the rear unit viewed from a front side.

As illustrated in FIG. 4 that illustrates the rear unit in the disassembled view and in FIG. 8 that illustrates the rear unit viewed from the front side, the motor output portions of the fourth and sixth lens drive motor units 151 and 152 respectively engage with arms 132 as drive transmitting members that transmit driving forces from the motor output portions to the fourth and sixth lens holding frames 104 and 106. Accordingly, the fourth lens driving motor unit 151 and the sixth lens driving motor unit 152 can respectively drive the fourth lens holding member 104 and the sixth lens holding member 106 in the optical axis direction. FIGS. 4 and 8 illustrate only the arm 132 provided for the sixth lens holding frame 106.

A configuration may be employed in which stepping motors are used as the fourth and sixth lens drive motor units 151 and 152, and lead screws provided in their motor output portions engage with the arms 132. When using the stepping motors, it is possible to omit the position detector and perform open control of the stepping motors.

The zoom operation ring 118 is provided with a groove portion that holds a mover of a linear resistance sensor (potentiometer) 134 as a zoom position detector (not illustrated) fixed to the guide barrel 116. Changing the output of the linear resistance sensor 134 with the rotation amount of the zoom operation ring 118 makes it possible to detect zoom positions.

A focus operation ring 114 is sandwiched and held between the front fixed barrel 115 and the rear fixed barrel 112 so as to be rotatable around the outer periphery of the front fixed barrel 115 at a fixed position in the optical axis direction. The rotation amount and direction of the focus operation ring 114 are detected by a photodetector provided on the front fixed barrel 115 and a stripe scale provided on the inner peripheral portion of the focus operation ring 114 so as to face the photodetector.

A multipurpose operation ring 121 is sandwiched and held between the rear fixed barrel 112 and the exterior barrel 113 so as to be rotatable around the outer periphery of the rear fixed barrel 112 at a fixed position in the optical axis direction. The rotation amount and direction of the multipurpose operation ring 121 are detected by a photodetector provided on the rear fixed barrel 112 and a stripe scale provided on the inner peripheral portion of the multipurpose operation ring 121 so as to face the photodetector. In addition, the multipurpose operation ring 121 and the rear fixed barrel 112 have a click mechanism for providing a click feeling to a user's operation. The click mechanism includes a plurality of groove portions and a click pin biased by a spring against the groove portions.

A lens control unit (control board) 119 as a controller controls the entire operation of the interchangeable lens 100 such as focus drive control, diaphragm drive control and image stabilization control. When zooming is performed, the lens control unit 119 moves the fourth and sixth lens units L4 and L6 (that is, controls drive of the fourth and sixth lens drive motor units 151 and 152) so as to keep variation amounts of a focal position and various aberrations below a certain value. The lens controller 119 is fixed to the rear fixed barrel 112 with screws.

Figure 5:
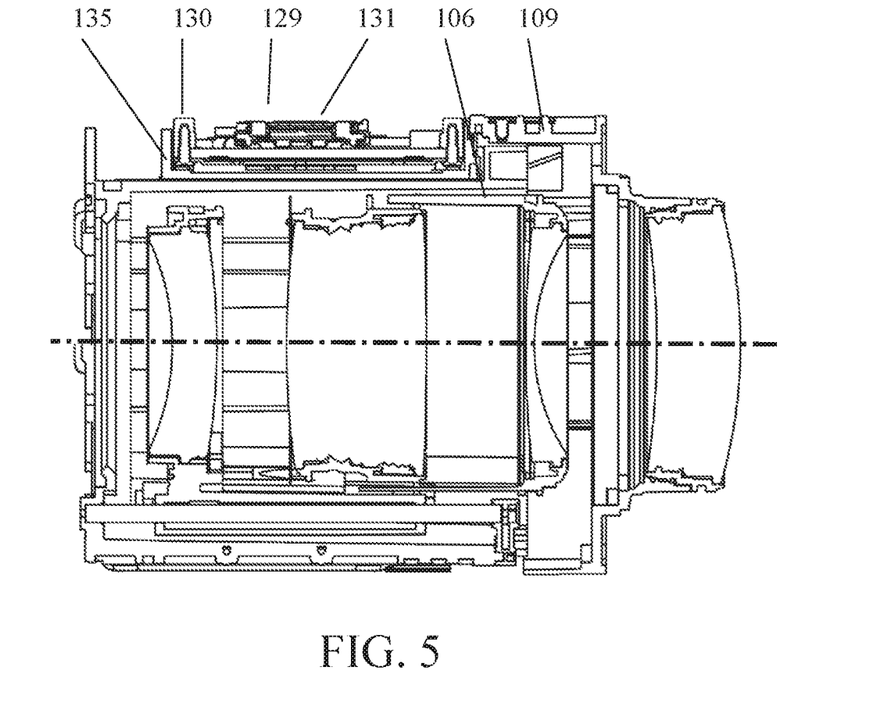
FIG. 5 is a sectional view of the rear unit in the embodiment.

Next, a more detailed configuration of the rear unit will be described with reference to FIGS. 4 and 5. FIG. 4 illustrates, as described above, the disassembled rear unit. FIG. 5 illustrates a section of the rear unit along the optical axis. The rear unit base 126 that moves straight during zooming holds the third to sixth lens units L3 to L6. However, FIGS. 4 and 5 illustrate only the fourth to sixth lens units L4 to L6.

As described above, the fourth lens unit L4 held by the fourth lens holding frame 104 is the floating lens unit, and is driven by the fourth lens drive motor unit 151 in the optical axis direction. A sleeve portion 104a of the fourth lens holding frame 104 is engaged (fitted) with the guide bar 153 at two locations on the front and rear sides of the sleeve portion 104 so as to be movable in the optical axis direction. Thereby, a position shift of the fourth lens holding frame 104 in the direction orthogonal to the optical axis and a tilt thereof with respect to the optical axis are prevented.

Further, a U-groove portion 104b of the fourth lens holding frame 104 is engaged with a rotation stopping bar 154 as a first rotation stopping member so as to be movable in the optical axis direction. The front end of the rotation stopping bar 154 is held by the rear unit base 126, and the rear end thereof is held by s second rear unit cover 128 fixed to the rear unit base 126.

The arm 132 rotatably attached to the fourth lens holding frame 104 engages with the motor output portion of the fourth lens drive motor unit 151 with a biasing force from an arm biasing spring (biasing member) 133 that is a torsion coil spring disposed around a rotation center axis of the arm 132. As a result, backlash of the arm 132 with respect to the motor output portion is removed. Further, the biasing force of the arm biasing spring 133 biases the fourth lens holding frame 104 in a direction in which the fourth lens holding frame 104 rotates around the guide bar 153 to bring the U-groove portion 104b into contact with the rotation stopping bar 154. As a result, rotational backlash of the fourth lens holding frame 104 is removed.

The position of the fourth lens holding frame 104 in the optical axis direction with respect to the rear unit base 126 is detected by reading the above-described scale fixed to the fourth lens holding frame 104 by a fourth lens position sensor 157 as a first position detector fixed to the rear unit base 126. The fourth lens position sensor 157 may be provided on at least one of the rear unit base 126 and the fourth lens holding frame 104.

The fifth lens holding frame 105 is held by the rear unit base 126 via three cam followers 159 fixed to follower mounting portions 105a provided at three circumferential locations on the fifth lens holding frame 105.

Further, as described above, the sixth lens unit L6 held by the sixth lens holding frame 106 is the focus lens unit, and is driven by the sixth lens drive motor unit 152 in the optical axis direction. A sleeve portion 106a of the sixth lens holding frame 106 is engaged (fitted) with the guide bar 155 at two locations on the front and rear sides of the sleeve portion 106a so as to be movable in the optical axis direction. Thereby, a position shift of the sixth lens holding frame 106 in the direction orthogonal to the optical axis and a tilt thereof with respect to the optical axis are prevented.

Moreover, a U-groove portion 106b of the sixth lens holding frame 106 is engaged with a rotation stopping bar 156 as a second rotation stopping member so as to be movable in the optical axis direction. The front end of the rotation stopping bar 156 is held by the rear unit base 126, and the rear end thereof is held by the second rear unit cover 128.

The other arm 132 rotatably attached to the sixth lens holding frame 106 engages with the motor output portion of the sixth lens drive motor unit 152 with a biasing force from another arm biasing spring 133 disposed around a rotation center axis of the arm 132. As a result, backlash of the arm 132 with respect to the motor output portion is removed. Further, the biasing force of the arm biasing spring 133 biases the sixth lens holding frame 106 in a direction in which the sixth lens holding frame 106 rotates around the guide bar 155 to bring the U-groove portion 106b into contact with the rotation stopping bar 156. As a result, rotational backlash of the sixth lens holding frame 106 is removed.

The position of the sixth lens holding frame 106 in the optical axis direction with respect to the rear unit base 126 is determined by the position of the motor unit drive base 135 with respect to the rear unit base 126 and the position of the motor mover of the sixth lens drive motor unit 152 with respect to the motor unit drive base 135 in the optical axis direction.

The position of the sixth lens holding frame 106 in the optical axis direction with respect to the rear unit base 126 is detected by reading a scale fixed to the sixth lens holding frame 106 by a sixth lens position sensor 158 as a second position detector fixed to the rear unit base 126. The sixth lens position sensor 158 may be provided on at least one of the rear unit base 126 and the sixth lens holding frame 106.

Next, description will be made of data used in drive control of the sixth lens unit L6 that is the focus lens unit during zooming. Hereinafter, the description will only be made of the sixth lens unit L6 and the sixth lens drive motor unit 152 that drives the sixth lens unit L6, but the same applies to the fourth lens unit L4 and the fourth lens drive motor unit 151 that drives the fourth lens unit L4.

Figure 6:
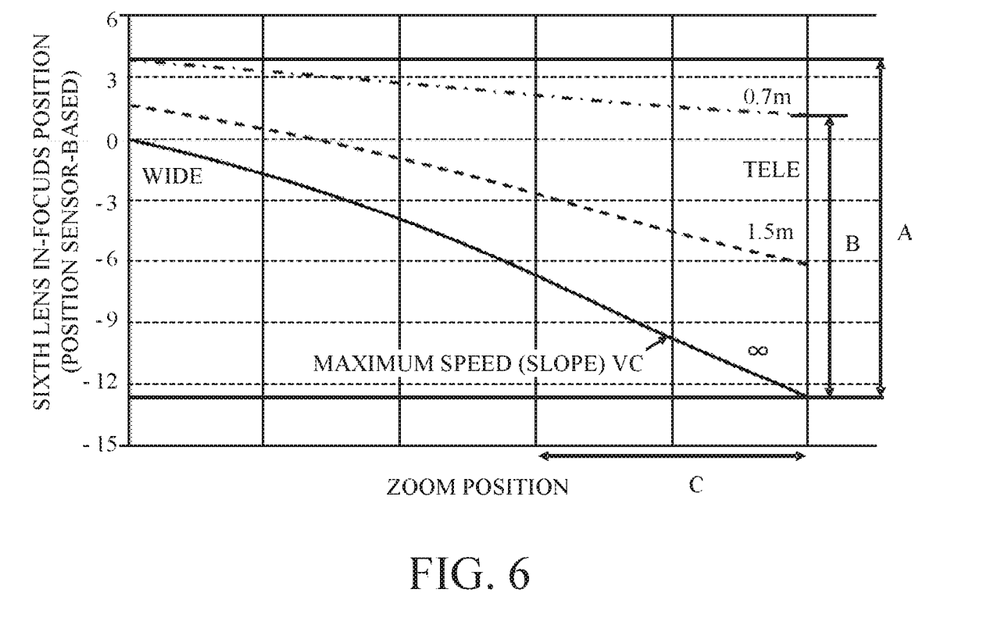
FIG. 6 is another diagram illustrating the sixth lens in-focus position.

FIG. 6 illustrates in-focus positions of the sixth lens holding frame 106 holding the sixth lens unit L6 (the in-focus positions are hereinafter referred to as "sixth lens in-focus positions") with respect to focal lengths (zoom positions). The sixth lens position sensor 158 is fixed to the rear unit base 126, and moves in the optical axis direction with respect to the fixed barrels 112 and 115 together with the rear unit during zooming. For this reason, FIG. 6 illustrates not the sixth lens in-focus positions with respect to the fixed barrels 112 and 115 (in other words, fixed barrel-based in-focus positions), but the sixth lens in-focus positions detected by the sixth lens position sensor 158 (in other words, position sensor-based or rear unit-based in-focus positions).

In FIG. 6, the horizontal axis represents the focal length (zoom position), which continuously indicates from the wide-angle end to the telephoto end. The vertical axis represents the sixth lens in-focus position based on a reference in-focus position (0) for focusing on infinity at the wide-angle end. The sixth lens in-focus position on an imaging surface side is expressed as a positive position, and the sixth lens in-focus position on the object side is expressed as a negative position. Further, the solid line indicates the sixth lens in-focus position for focusing on infinity, the broken line indicates the sixth lens in-focus position for focusing on 1.5 m object distance, and the dashed-dotted line indicates the sixth lens in-focus position for focusing on 0.7 m object distance. The output from the sixth lens position sensor 158 is position information of the sixth lens holding frame 106 used for feedback control of the sixth lens drive motor unit 152.

Figure 1:
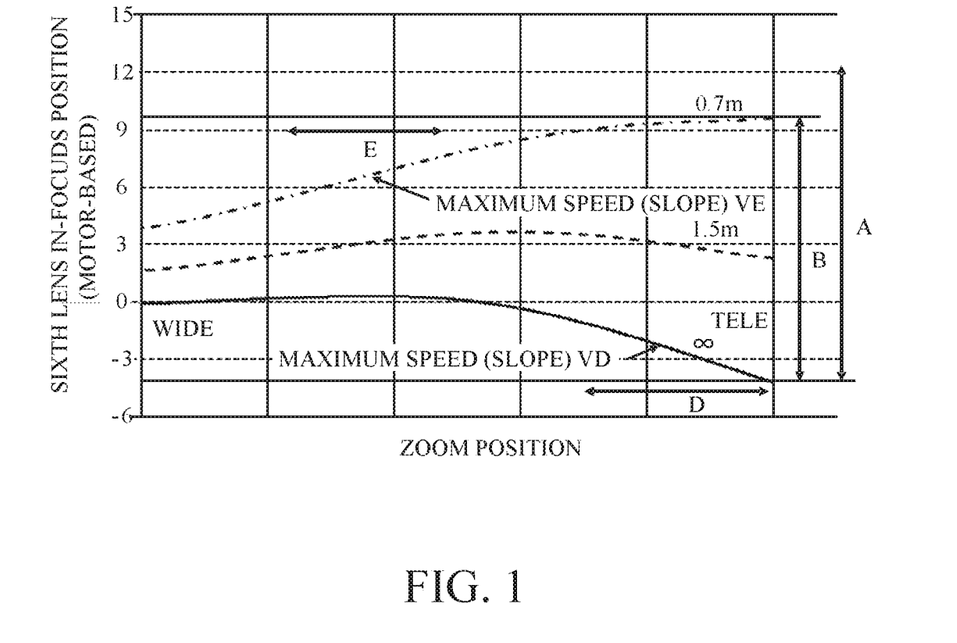
FIG. 1 is a diagram illustrating a sixth lens in-focus position in an interchangeable lens that is an embodiment of the present invention.

FIG. 1 illustrates, as with FIG. 6, the sixth lens in-focus positions with respect to the zoom positions. However, FIG. 1 illustrates the sixth lens in-focus positions with respect to the motor stator 130 of the sixth lens drive motor unit 152 (in other words, motor-based in-focus positions). The sixth lens in-focus positions are positions from the same reference position (0) as that in FIG. 6. Since the motor stator 130 of the sixth lens drive motor unit 152 is fixed to the motor unit drive base 135 that is integral with the seventh unit base 109 in the optical axis direction, the sixth lens in-focus positions illustrated in FIG. 1 can be said as seventh unit-based in-focus positions. The meanings of the horizontal axis, vertical axis, positive, negative, solid line, broken line and dashed-dotted line in FIG. 1 are the same as those in FIG. 6.

Figure 7:
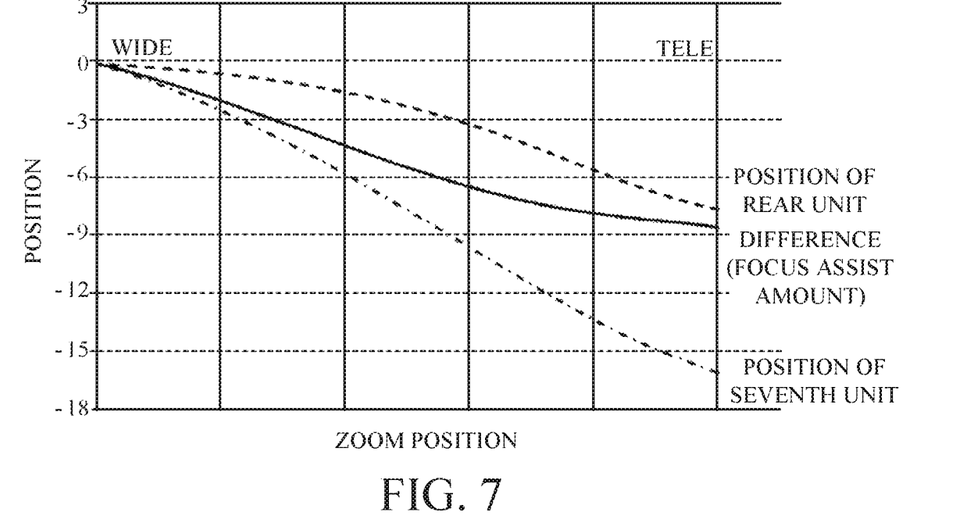
FIG. 7 is a diagram illustrating positions of the rear unit base and a seventh unit base and their difference in the embodiment.

FIG. 7 illustrates the position (broken line) of the rear unit base 126, the position (dashed-dotted line) of the seventh unit base 109 and their difference (solid line) with respect to the zoom position. The horizontal axis represents the zoom position, which continuously indicates from the wide-angle end to the telephoto end. The vertical axis represents the positions of the rear unit base 126 and the seventh unit base 109 when a position for focusing on infinity at the wide-angle end is set to a reference position (0).

The difference in FIG. 7 indicates the change amount of the position of the sixth lens holding frame 106 detected by the sixth lens position sensor 158 when the sixth lens drive motor unit 152 is not driven during zooming, in other words, a focus assist amount obtained by the movement of the seventh unit with respect to the rear unit.

In this embodiment, electronic cam data indicating the motor-based sixth lens in-focus positions for each object distance illustrated in FIG. 1 is stored in the memory in the lens control unit 119. The motor-based sixth lens in-focus positions can be obtained by subtracting the focus assist amounts illustrated in FIG. 7 from the position sensor-based sixth lens in-focus positions for each object distance illustrated in FIG. 6. The electronic cam data can be said as data obtained based on the focus assist amount. The lens control unit 119 controls the drive of the sixth lens drive motor unit 152 during zooming using the stored electronic cam data.

Under the position sensor basis illustrated in FIG. 6, the drive amount required for the sixth lens drive motor unit 152 (hereinafter referred to as "a sixth lens motor drive amount") is A in the figure. However, under the motor basis illustrated in FIG. 1, the sixth lens motor drive amount can be B smaller than A as illustrated in FIGS. 1 and 6. That is, the maximum value A of the movement amount of the sixth lens holding frame 106 with respect to the rear unit base 126 and the maximum value B of the movement amount of the sixth lens holding frame 106 with respect to the motor unit drive base 135 (seventh unit base 109) satisfy the following condition:

$$A > B.$$

Therefore, the configuration in Which the motor stator 130 is fixed to the motor unit drive base 135 that is integrally connected to the seventh unit base 109 in the optical axis direction as in this embodiment makes it possible to reduce the sixth lens motor drive amount as compared with a configuration in which the motor stator 130 is fixed to the rear unit base 126 to which the guide bar 155 and the sixth lens position sensor 158 are fixed. As a result, the configuration in this embodiment can reduce the length of the sixth lens drive motor unit 152 in the optical axis direction, which can contribute to downsizing of the interchangeable lens 100. In other words, the configuration in this embodiment can secure a large total drivable amount of the sixth lens unit L6 while reducing an increase in motor drive amount of the sixth lens unit L6.

The slopes of the curves indicating the sixth lens in-focus positions illustrated in FIGS. 1 and 6 each indicate a drive speed of the sixth lens holding frame 106 driven by the sixth lens drive motor unit 152 (the drive speed is hereinafter referred to as "a motor drive speed"). The motor drive speed indicates one when the zoom operation ring 118 rotates at a certain rotation speed.

This embodiment can make motor drive seeds VD and VE in zoom areas D and E where the absolute value of the slope is largest (that is, the motor drive speed is fastest) in FIG. 1 slower than a motor drive seed VC in a zoom area C where the absolute value of the slope is largest in FIG. 6. In other words, the maximum value VC of the absolute value of the motor drive speed of the sixth lens holding frame 106 driven by the sixth lens drive motor unit 152 with respect to the rear unit base 126 and the maximum value VD of the absolute value of the motor drive speed with respect to the motor unit drive base 135 satisfy the following condition:

$VC > VD$.

Accordingly, the maximum drive speed required for the sixth lens drive motor unit 152 can be slowed down, and the drive speed of the sixth lens unit L6 when the zoom operation ring 118 rotates quickly can be reduced, thereby making it possible to improve focus followability.

Further, the rear unit base 126 holds the fifth lens holding frame 105, and moves so as to draw the same locus as that of the fifth lens unit (first optical element) L5 during zooming. On the other hand, the seventh unit base 109 and the motor unit drive base 135 move so as to draw the same locus as that of the seventh lens unit (second optical element) L7 during zooming.

This configuration makes it possible to optimize movements of the fifth to seventh lens units L5 to L7 and difference between the movements of the fifth and seventh lens units L5 and L7 for various factors such as aberrations, the motor drive speed, the motor drive amount and the weight and total length of the interchangeable lens 100. Although the fifth and seventh lens units L5 and L7 are disposed with the sixth lens unit L6 interposed therebetween in the optical axis direction in this embodiment, the first optical element and the second optical element may be mutually adjacently disposed in the optical axial direction.

Next, the biasing of the sixth lens holding frame 106 and the biasing of the motor unit drive base 135 by the biasing force of the arm biasing spring 133 will be described. FIG. 8 illustrates the rear unit seen from the optical axis direction (front side). The sixth lens holding frame 106 receives a force F1 by the biasing force of the arm biasing spring 133. The force F1 generates a force F2 that pushes the sleeve portion 106a of the sixth lens holding frame 106 against the guide bar 155, and a force F3 that pushes the U-groove portion 106b against the rotation stopping bar 156. As a result, the forces F1 to F3 are mutually balanced, and moments generated by the forces F1 to F3 are also mutually balanced. Thereby, the sixth lens holding frame 106 is stably held.

In this state, a force −F1 that is the reaction force of the force F1 biases the motor mover 131 to press it against the motor stator 130. This force −F1 is transmitted from the motor mover 131 to the motor stator 130 and the motor unit drive base 135 holding the motor stator 130. Hereinafter, description will be made of balances of forces and moments acting between the motor mover 131, the motor unit drive base 135 and the rear unit base 126.

Figure 9:
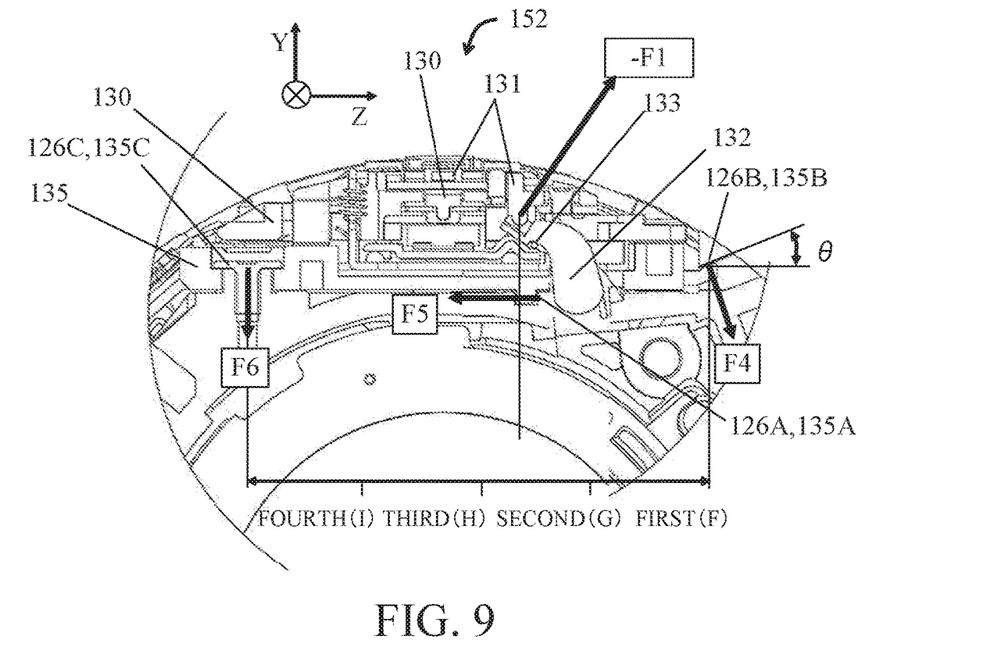
FIG. 9 is an enlarged view of part of FIG. 8.
Figure 10:
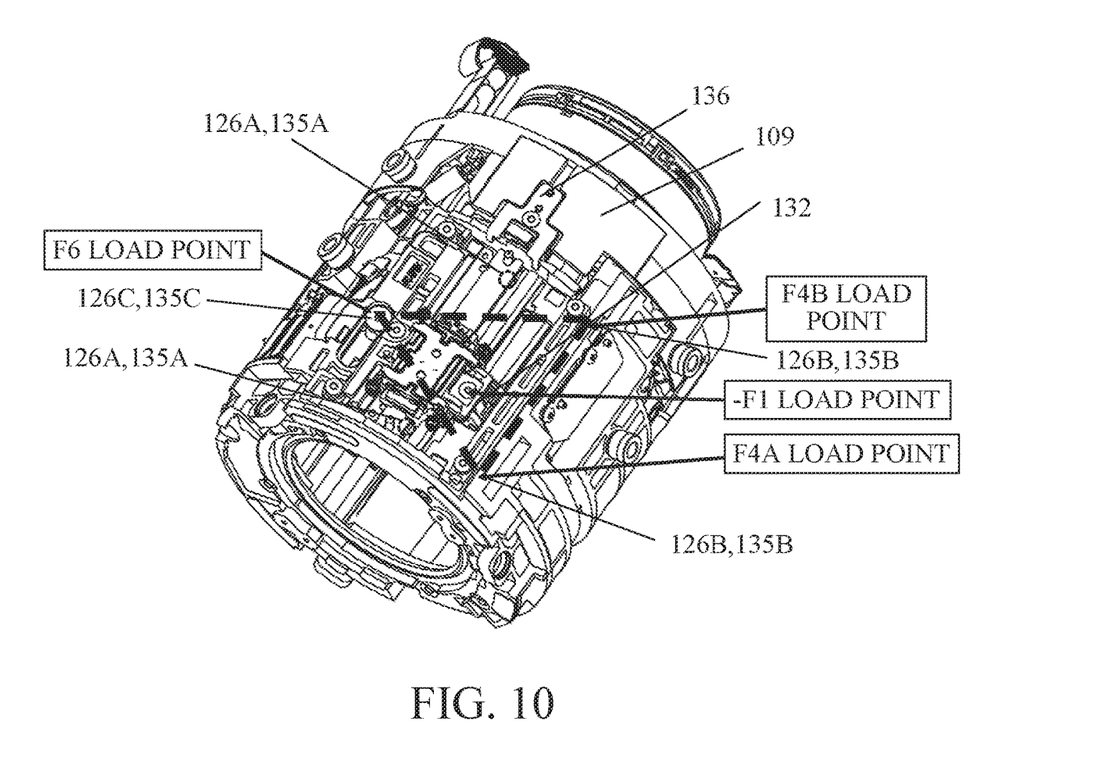
FIG. 10 is a perspective view of the rear unit in the embodiment.

FIG. 9 illustrates an enlarged view of the periphery of the sixth lens drive motor unit 152 illustrated in FIG. 8. In this figure, the axis extending in a direction in which the motor mover 131 is biased against the motor stator 130 is a Y axis, and the axis extending in a direction orthogonal to the Y axis and the optical axis direction is a Z axis. Further, FIG. 10 illustrates the rear unit seen from an oblique direction.

The motor unit drive base 135 and the rear unit base 126 have the following portions that contact each other. First, the motor unit drive base 135 has guide protrusions (guide portions) 135A at two locations shifted in the optical axis direction. Similarly, the rear unit base 126 has guide groove portions 126A at two locations shifted in the optical axis direction. The movement of the guide protrusions 135A along the guide groove portions 126A guides the movement of the motor unit drive base 135 in the optical axis direction.

Further, the motor unit drive base 135 has slope contact portions 115B each having an angle of θ with respect to the Z axis (that is, the slope contact portion 135B is not parallel to the Z axis) at two locations shifted in the optical axis direction. Similarly, the rear unit base 126 has slope contact portions 126B each having an angle of θ with respect to the Z axis at two locations shifted in the optical axis direction. The slope contact portions 135B and 126B contact each other. When the motor unit drive base 135 moves in the optical axis direction, the slope contact portions 135B and 126B slide on each other. As illustrated in FIG. 10, the two slope contact portions 135E and 126B are arranged so as to sandwich a load point of the force −F1 from the aria biasing spring 133 in the optical axis direction.

Moreover, in FIG. 9, on the opposite side of the slope contact portions 135B and 1263 across the arm biasing spring 133 in the Z axis direction, the rear unit base 126 has a separation stopping portion 126C, and the motor drive base 135 has a separation stopping groove portion 135C as a separation stopping portion (separation regulating portion). The separation stopping portion 126C and the separation stopping groove portion 135C are provided at one location between the two slope contact portions 135B and 126B in the optical axis direction. The separation stopping portion 126C engages with the separation stopping groove portion 135C to prevent the motor drive base 135 from separating from the rear unit base 126.

In this embodiment, as the separation stopping portion 126C of the rear unit base 126, a head of a screw fixed to the rear unit base 126 is used in consideration of the ease of manufacturing parts and assemblability. An engaging surface of the separation stopping portion 126C is parallel to the Z axis. However, the engaging surface may have a slope with respect to the Z axis. Further, although the guide surface of the guide groove portion 126A is parallel to the Y axis in consideration of the ease of manufacturing parts in this embodiment, it may have a slope with respect to the Y axis.

Next, description will be made of forces and moments acting in the rear unit. The force −F1 generated by the arm biasing spring 133 is a force that pushes the motor unit drive base 135 to a positive side in the Y axis direction (upper side in FIG. 9) and a positive side in the Z axis direction (right side in FIG. 9). Hereinafter, the force −F1 is divided into a component force in the Y axis direction and a component force in the Z axis direction, and they are respectively expressed as −F1Y and −F1Z.

The forces that the motor unit drive base 135 receives from the rear unit base 126 from contact points with the rear unit base 126 are as follows. The forces received from the two slope contact portions 126B are represented by F4A and F4B, and the resultant force is represented by F4. The forces received by the motor unit drive base 135 from the two guide groove portions 126A are represented by F5A and F5B, and the resultant force is represented by F5. The force received by the separation stopping portion 126C is represented by F6. A component force in the Y axis direction and a component force in the Z axis direction of each force are represented by adding Y and Z to their end as with −F1(−F1Y and −F1Z). From the balance of the forces acting on the motor unit drive base 135, the following expressions are established.

$$Y \text{ axis direction: } -F1Y - F4Y(-F5Y) - F6Y = 0$$

$$Z \text{ axis direction: } -F1Z + F4Z + F5Z(+F6Z) = 0$$

In this embodiment, both F5Y and F6Z are 0. However, F5Y and F6Z may be values other than 0 by forming each contact portion so as to have slopes with respect to the Y axis and the Z axis.

Similarly, F4 to F6 are determined from the balance of the moments. Setting each of F4 to F6 to a force larger than 0 makes it possible to bias the guide protrusion 135A against the guide groove portion 126A.

In this embodiment, the force −F1Z that is a force in the Z direction generated by the arm biasing spring 133 and the force F4Z generated by the slope contact portion 135B (which may be rephrased as a force that slides down the slope surface) act in the same direction, so that it is possible to efficiently bias the guide protrusion 135A against the guide groove portion 126A.

Further, in this embodiment, regardless of change in position of the motor mover 131 depending on the focal length and the focal position, the load point of −F1 is located inside a triangle formed by connecting load points of F6, F4A and F4B by straight lines as illustrated by the broken line in FIG. 10. Thereby, F4A, F4B and F6 that are generated by pressurization by −F1 can be set to forces larger than 0. It is desirable that the load point of −F1 be located between the load point of F4 and the load point of F6 in the Z axis direction.

It is more desirable that, as illustrated in FIG. 9, when a range from the load point of F4 to the load point of F6 into four ranges F, G, H, and I in order from a side closer to the load point of F4, the load point of −F1 be located in the second range G or the third range Et Thereby, the load points of F4 and F6 can be brought close to each other.

Further, since F4 acts at two load points of F4A and F4B, locating the load point of −F1 in the second range G from the side closer to the load point of F4 in the above four-divided ranges makes it possible to make F4A, F4B and F6 more equal to one another.

Further, locating the load point of F5A and the load point of F5B at the same position or close to each other in the Z axis direction makes it possible to suppress rotation of the motor unit drive base 135.

In this embodiment, each force is expressed as a force perpendicular to the contact surface (that is, as a normal force) by setting the friction coefficient between the contact surfaces contacting each other to zero. However, since friction actually occurs between the contact surfaces, it is necessary to secure a sufficient margin of force against the friction in order to provide the above-described biasing. Further, in order to reduce friction due to a reaction force generated by driving the motor mover and the lens holding frame and gravity, it is necessary to set each part to move smoothly.

The guide protrusion 135A, the separation stopping groove portion 135C and the slope contact portion 135B provided on the motor unit drive base 135 may be provided on a motor fixing portion of the sixth lens drive motor unit 152.

As described above, in this embodiment, the fourth and sixth lens drive motor units 151 and 152 fixed to the motor unit drive base 135 are held such that their displacements in the optical axis direction with respect to the motor unit drive base 135 and the seventh unit base 109 are restricted by the motor unit drive base 135. Further, displacements of the motor unit drive base 135 and the fourth and sixth lens drive motor units 151 and 152 in five axial directions other than the optical axis direction (displacements in two axial directions orthogonal to the optical axis, rotation about the optical axis, and rotations about two axes orthogonal to the optical axis with respect to the rear unit base 126 are restricted by the rear unit base 126. Employing such a configuration makes it possible to reduce the drive amounts required for the fourth and sixth lens drive motor units 151 and 152, and moreover to reduce the distance between the fifth and sixth lens units L5 and L6 and the distance between the sixth and seventh lens units L6 and L7. Thus, it is possible to reduce the size of the interchangeable lens 100.

Further, in this embodiment, the fourth and sixth lens drive motor units 151 and 152 are fixed not to the rear unit base 126 to which the guide bars 153 and 155 and the fourth and sixth lens position sensors 157 and 158 are fixed and that moves in the optical axis direction during zooming, but to the motor unit drive base 135 that moves in the optical axis direction independently of the rear unit base 126 during zooming. Thereby, it is possible to reduce the size of each lens drive motor unit and the size of the interchangeable lens 100, and to reduce the required motor drive speed.

Moreover, in this embodiment, the biasing force generated by the arm biasing spring 133, which is used for removing the backlash between the fourth and sixth lens holding frames 104 and 106 and the bars (guide bars 153, 155 and rotation stopping bars 154, 156), is utilized for removing the backlash of the fourth and sixth lens drive motor units 151 and 152. Thereby, the backlash of the fourth and sixth lens drive motor units 151 and 152 can be removed without increasing the number of parts.

Although the above embodiment described the case where zooming is performed by the user's manual rotation operation, the features of the above embodiment can also be employed when zooming is performed by driving by a drive unit. In this case, a drive unit other than the vibration-type motor may be used.

The above embodiment can ensure a large total drivable amount of the optical element (lens unit) while reducing an increase in motor drive amount of the optical element.

While the present invention has been described with reference to exemplar)/embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-190710, filed on Oct. 18, 2019 which is hereby incorporated by reference herein in its entirety.

What is claimed is:

1. An optical apparatus comprising:
a fixed member;

a first movable member that is movable with respect to the fixed member in an optical axis direction;

a holding member that holds an optical element and is movable with respect to the first movable member in the optical axis direction;

a guide member that is held by the first movable member and guides the holding member in the optical axis direction;

a second movable member that is movable with respect to the fixed member in the optical axis direction independently of the first movable member; and a drive unit configured to drive the holding member in the optical axis direction, wherein the second movable member holds the drive unit so as to restrict displacement of the drive unit with respect to the second movable member in the optical axis direction, and wherein the drive unit is disposed entirely on an outer peripheral side of the first movable member.

2. The optical apparatus according to claim 1, wherein displacement of the drive unit in directions other than the optical axis direction is restricted by the first movable member.

3. The optical apparatus according to claim 1, wherein a maximum value A of a movement amount of the holding member with respect to the first movable member and a maximum value B of a movement amount of the holding member with respect to the second movable member satisfy the following condition:

$$A > B.$$

4. The optical apparatus according to claim 1, further comprising a position detector configured to detect a position of the holding member with respect to the first movable member in the optical axis direction, wherein the position detector is provided on at least one of the first movable member and the holding member.

5. The optical apparatus according to claim 1, wherein, when the first movable member and the second movable member move in the optical axis direction during zooming, the drive unit drives the holding member in the optical axis direction for focusing.

6. The optical apparatus according to claim 5, further comprising a first optical element and a second optical element each of which is an optical element other than the optical element held by the holding member, wherein, during zooming, the first movable member moves in the optical axis direction so as to draw a locus that is the same as that of the first optical element, and the second movable member moves in the optical axis direction so as to draw a locus that is the same as that of the second optical element.

7. The optical apparatus according to claim 6, wherein, in the optical axis direction, the first movable member and the second movable member are mutually adjacently disposed or disposed with the optical element interposed therebetween.

8. The optical apparatus according to claim 5, further comprising a controller configured to control drive of the drive unit by using data obtained from difference between movement amounts of the first movable member and the second movable member during zooming.

9. The optical apparatus according to claim 1, further comprising:

a drive transmitting member that engages with an output portion of the drive unit to transmit a driving force of the drive unit to the holding member; and a biasing member that biases the drive transmitting member against the output portion of the drive unit, wherein a biasing force of the biasing member biases the drive unit and the second movable member against the first movable member in a direction orthogonal to the optical axis direction.

10. The optical apparatus according to claim 9, wherein the first movable member and one of the second movable member and a stator of the drive unit have:

guide portions that engage with each other to guide the second movable member in the optical axis direction;

separation regulating portions that engage with each other to prevent the second movable member from separating from the first movable member in the direction orthogonal to the optical axis direction; and contact portions that are formed as slope surfaces not parallel to the separation stopping portions in a plane orthogonal to the optical axis direction and that contact each other.

11. The optical apparatus according to claim 10, wherein the separation regulating portions and the contact portions are respectively provided at at least three locations, and when viewing a triangle formed by connecting the three locations from the direction orthogonal to the optical axis direction, a position where the drive transmitting member and the output portion of the drive unit engage with each other is located in the triangle.

12. The optical apparatus according to claim 10, wherein, when viewing from the optical axis direction, the position where the drive transmitting member and the output portion of the drive unit engage with each other is located between the separation stopping portion and the contact portion.

13. The optical apparatus according to claim 10, wherein the contact portion generates, from the biasing force of the biasing member, a biasing force that biases the guide portions in a direction in which the guide portions engage with each other.

14. The optical apparatus according to claim 10, wherein, when viewing from the optical axis direction, the guide portion is located between the separation stopping portion and the contact portion.

15. The optical apparatus according to claim 1, wherein the optical apparatus is detachably attachable to an imaging apparatus.

16. The optical apparatus according to claim 1, further comprising an image sensor that receives light from the optical element.

17. An optical apparatus comprising:

a fixed member;

a first movable member that is movable with respect to the fixed member in an optical axis direction;

a holding member that holds an optical element and is movable with respect to the first movable member in the optical axis direction;

a guide member that is held by the first movable member and guides the holding member in the optical axis direction;

a second movable member that is movable with respect to the fixed member in the optical axis direction independently of the first movable member; and a drive unit configured to drive the holding member in the optical axis direction, wherein the second movable member holds the drive unit so as to restrict displacement of the drive unit with respect to the second movable member in the optical axis direction, wherein displacement of the drive unit in directions other than the optical axis direction is restricted by the first movable member, and wherein, when the holding member is driven by the drive unit, a maximum value VC of an absolute value of a drive speed of the holding member with respect to the first movable member and a maximum value VD of an absolute value of a drive speed of the holding member with respect to the second movable member satisfy the following condition:

$VC > VD$.

* * * * *